UNITED STATES PATENT OFFICE.

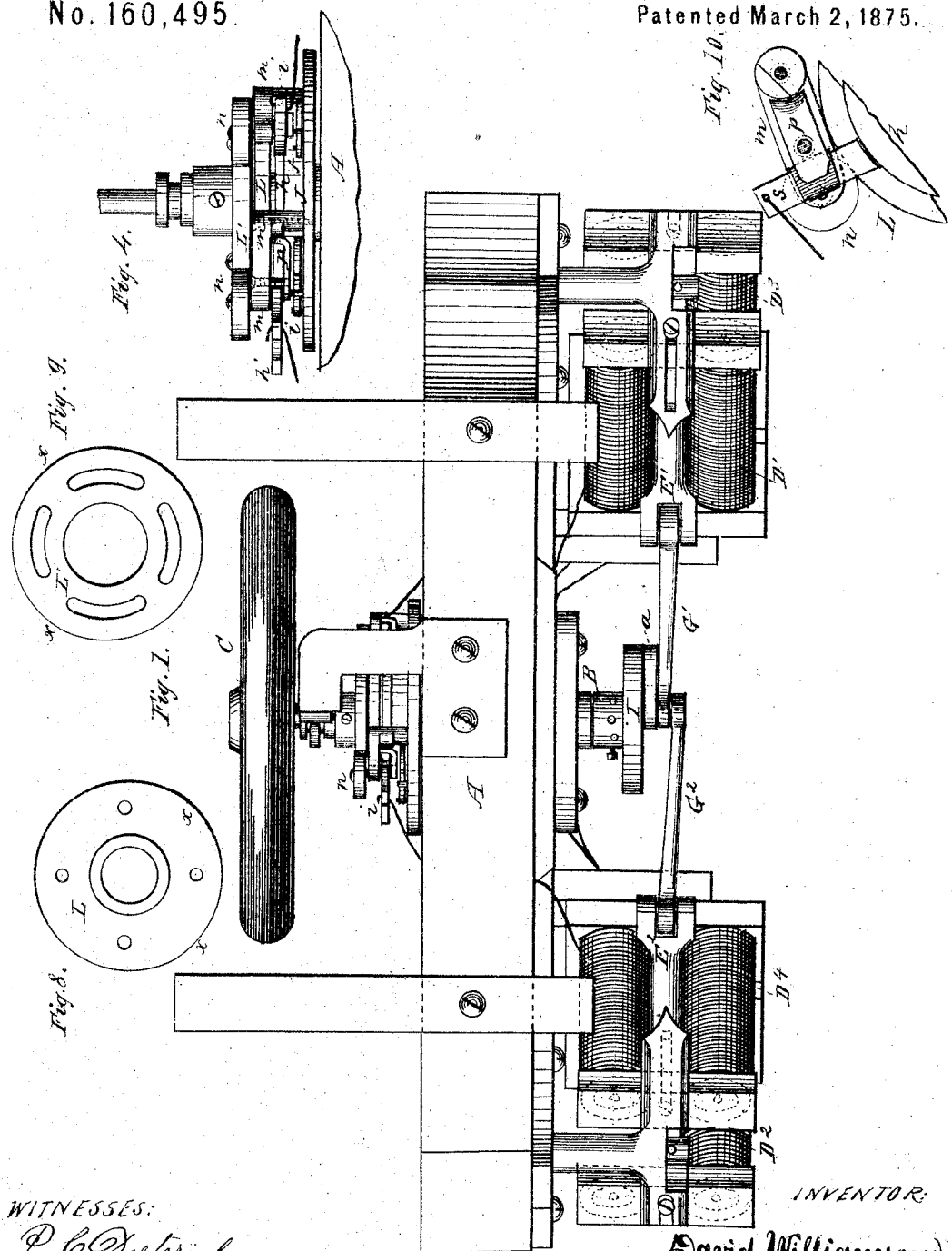

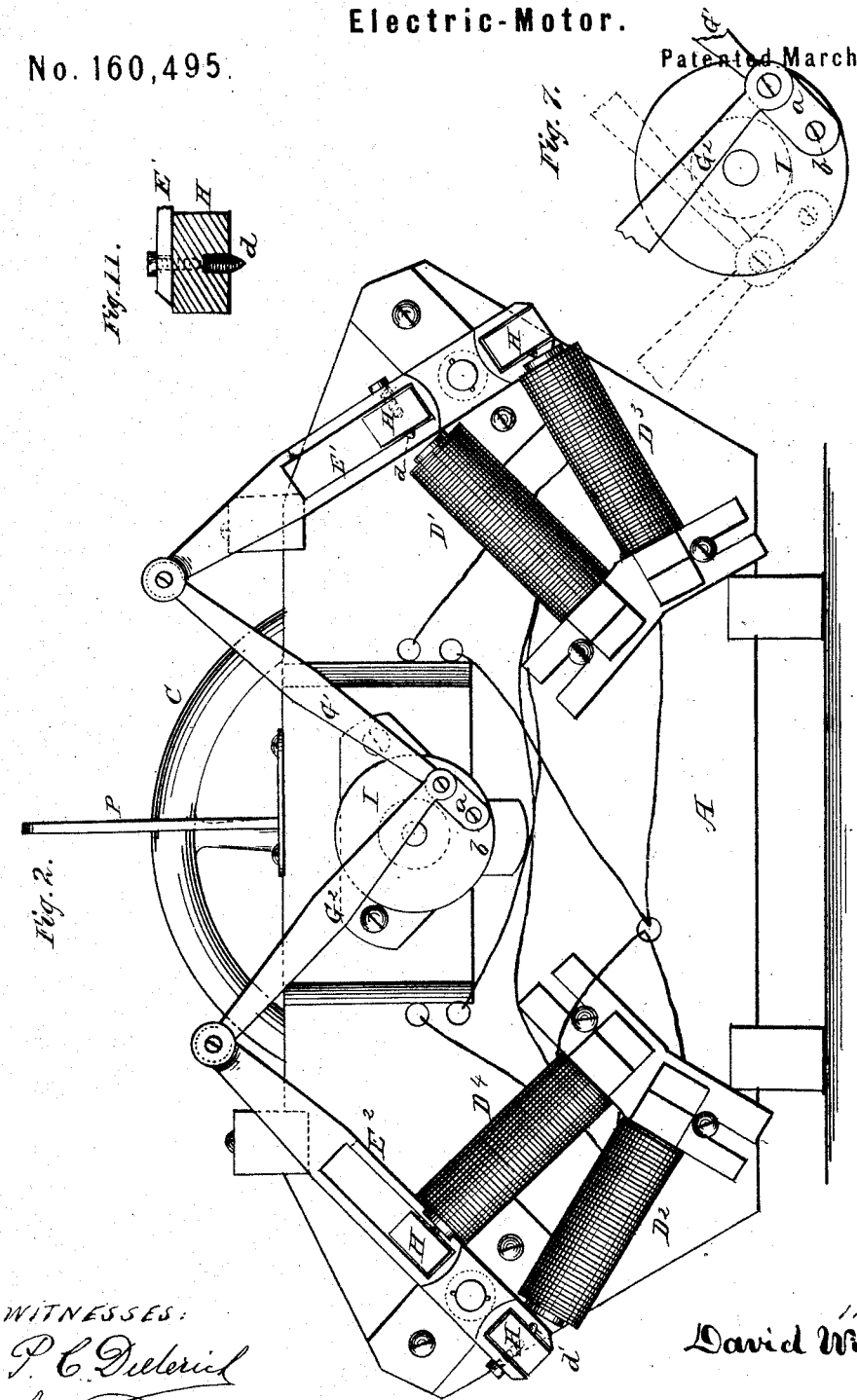

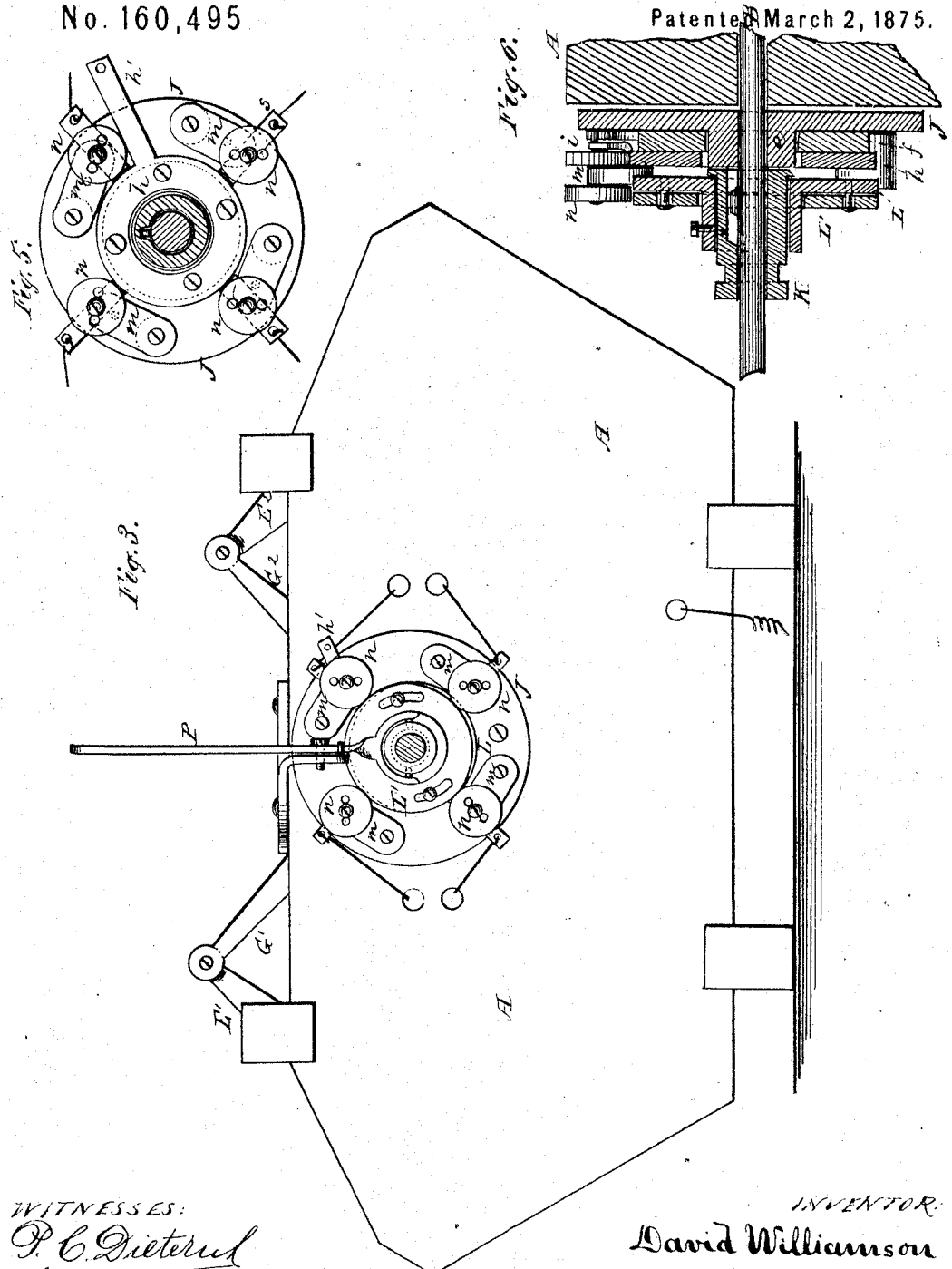

DAVID WILLIAMSON, OF GREENVILLE, NEW JERSEY.

IMPROVEMENT IN ELECTRIC MOTORS.

Specification forming part of Letters Patent No. 160,495, dated March 2, 1875; application filed January 8, 1875.

*To all whom it may concern:*

Be it known that I, DAVID WILLIAMSON, of Greenville, in the county of Hudson and State of New Jersey, have invented certain new and useful Improvements in Electric Motors; and I do hereby declare that the following is a full, clear, and exact description thereof, which will enable others skilled in the art to which it pertains to make and use the same, reference being had to the accompanying drawings, and to the letters of reference marked thereon, which form a part of this specification.

The nature of my invention consists in the construction and arrangement of an electric motor, as will be hereinafter more fully set forth.

In the annexed drawings, Figure 1 is a plan view of my motor. Figs. 2 and 3 are side elevations of the same. Figs. 4 to 11 are detached views of certain parts thereof.

A represents a suitable frame, to which the various parts of my electric motor are connected. In this frame, in suitable bearings, is placed the shaft B, to which motion is to be communicated, and from which motion is to be transmitted to the machine to be operated, said shaft being provided with a fly-wheel, C. On the frame A are arranged four sets or pairs of magnets, marked respectively $D^1$, $D^2$, $D^3$, and $D^4$, said magnets being arranged in two groups of two pairs each, one group on each side of the shaft B, and a suitable distance from it. $E^1$ $E^2$ represent two levers pivoted upon studs projecting from the frame A, one in the center of each group of magnets, immediately above the upper ends thereof. On each lever are fastened two armatures, H H, one for each set or pair of magnets, and one or both of these armatures may be adjustable upon the lever, so as to make them correspond with the position of the magnets. The ends of the two armature-levers $E^1$ $E^2$ are, by pitmen $G^1$ $G^2$ respectively, connected with a pin in one end of a crank, $a$, the other end of which is pivoted to or placed upon a stud, $b$, projecting from a disk, I, which is attached to the end of the shaft B. This pitman and connections are not more fully described here, being the subjects of a separate application.

In operation, the current of electricity is admitted to the coils surrounding the magnets in succession, as marked—for instance, commencing with the magnets $D^1$, then $D^2$, $D^3$, and $D^4$, and then $D^1$ again, and so on; but the electricity takes effect on each set of magnets an instant before the current with the preceding set in the series is closed. By the addition of the crank $a$ between the ends of the pitmen $G^1$ $G^2$ and the crank-pin $b$, it will be noticed that the points where the action of one armature-lever ceases and the other commences are on the live-centers; thus there is never any stoppage or lost motion on the dead-centers, and the engine runs smoothly and evenly with a rapid and steady motion.

To prevent the knocking noise and jar caused by the contact of the armatures H with their respective magnets, I apply cushions or bumpers $d$, made of rubber or other suitable material. Such bumpers may be applied in various ways—for instance, as shown in Figs. 2 and 11 of the drawing, by being inserted in the under sides of the armatures, to come in contact with the ends of the magnets; or the bumpers may be attached to adjustable rods between the magnets, for the armature-levers to strike against; or in any other suitable manner to accomplish the object sought. The driving-shaft B passes through a disk or plate, J, attached to the frame, and said disk is formed with a projecting hub, $e$, upon which is placed a wooden disk, $f$, or a disk made of any suitable insulating material. To the insulator $f$ is secured an annular copper ring, $h$, or a ring made of such material as is a good conductor of electricity. Outside of these parts a sleeve, K, is placed on the shaft B, said sleeve being feathered on the shaft, so as to revolve with it, but at the same time be capable of being moved laterally on the shaft. On the sleeve K is fastened a cam, L, in any convenient manner, and to this cam is fastened another cam, L'. These cams are formed in the shape shown in Figs. 8 and 9, each being a true circular disk with a part of the periphery slightly cut down, as shown at $x$ $x$ in said figures, and also by dotted lines in Fig. 3, said cut-down parts extending a little over one-fourth of the circumference. The cam L' is provided with curved slots, through which screws are passed into the cam L to fasten it thereto, and to adjust it so that the parts $x$ will be in opposite directions from the center. On the disk J, at equal distances apart, are pivoted four arms, $m$, the pivots being arranged on a circle concentric with the ring $h$, and the outer sides at the free ends of the arms are pivoted rollers $n$, as shown particularly in Figs. 3 and 5. These rollers are held against the periphery of the cams L or L', or both, as hereinafter described, by means of springs $i$ operating on the arms $m$. On the under side of each arm is a clamp, $p$, for holding a copper bar, $s$, suitable insulating material being introduced between said bar and the clamp. The magnetic coils (or coils surrounding the magnets) $D^1$, $D^2$, $D^3$, and $D^4$ are each connected at one end to one of the bars $s$, while the other ends of said coils are united together, and by a wire connected with one pole of the battery used, the other pole of the battery being, by a wire, connected with an arm, $h'$, extending from the ring $h$. The sleeve K is moved with its cams by means of a lever, P, so as to bring either cam in conjunction with the rollers $n$, or so that the rollers will touch both of them. The various parts are so arranged that when the rollers are held against the circular part of the periphery of the cam the bars $s$ will not be in contact with the ring $h$, but as soon as the cut-down part $x$ comes opposite a roller the spring actuating its arm will throw it inward till the bar $s$ touches the ring $h$, and thus establishes the current or connection with the corresponding set of magnets; the roller in the meantime is kept from touching the cam. In this manner the four circuits are closed and broken in succession to cause the four sets of magnets to actuate the armature-levers in the manner above described.

As the part $x$ of the cams is larger than one-fourth of the circumference, it will be seen that each circuit is closed an instant before the preceding one is broken. By changing the sleeve K so as to bring the cam L' against the rollers the motor is reversed, and by moving the sleeve so that the rollers touch both cams the motor is stopped. The inner ends of the bars $s$, as well as the ring $h$, where said bars touch, are coated with platinum to prevent the corroding of the copper.

It will be noticed that in this device there is no friction by sliding or otherwise of the parts that close and break the circuit, but the movement of these parts is positive, thereby preventing wear of the parts.

Having thus fully described my invention, what I claim as new, and desire to secure by Letters Patent, is—

1. The cushions or bumpers $d$ in combination with the magnets and armature-levers, substantially as and for the purpose specified.

2. The cams L L', attached to the adjustable slide K, in combination with rollers $n$ or equivalents, as and for the purpose described.

3. The cams L L', arranged as described, in combination with the slide K, arms $m$, rollers $n$, springs $i$, and bars $s$, substantially as and for the purpose set forth.

4. Two or more cross-bars, $s$, in combination with the fixed insulated device $h$ and $h'$ and the sliding cams L L', whereby the currents are completed and broken, dispensing with all friction, for the purpose herein described.

5. The magnets $D^1$, $D^2$, $D^3$, and $D^4$, and levers $E^1$ $E^2$, in combination with pitman $G^1$ $G^2$, crank $d$, and pin $b$, and shaft B, all as and for the purpose herein described.

In testimony that I claim the foregoing as my own, I affix my signature in presence of two witnesses.

DAVID WILLIAMSON.

Witnesses:
C. H. WATSON,
H. A. HALL.